United States Patent [19]
Firl et al.
[11] Patent Number: 4,910,528
[45] Date of Patent: Mar. 20, 1990

[54] INK JET PRINTER THERMAL CONTROL SYSTEM

[75] Inventors: Gerold G. Firl, Poway, Calif.; Frederick S. Berretta, Watertown, Mass.
[73] Assignee: Hewlett-Packard Company, Palo Alto, Calif.

[21] Appl. No.: 295,630
[22] Filed: Jan. 10, 1989
[51] Int. Cl.[4] .......... G01D 15/16; B41J 3/04
[52] U.S. Cl. .......... 346/1.1; 346/140 R
[58] Field of Search .......... 346/140, 76 PH, 1.1

[56] References Cited

U.S. PATENT DOCUMENTS

| | | | |
|---|---|---|---|
| 4,345,262 | 8/1982 | Shirato | 346/140 |
| 4,567,488 | 1/1986 | Moriguchi | 346/76 PH |
| 4,704,620 | 11/1987 | Ichihashi | 346/140 |
| 4,719,472 | 1/1988 | Arakawa | 346/140 |
| 4,791,435 | 12/1988 | Smith | 346/140 |

FOREIGN PATENT DOCUMENTS

| | | |
|---|---|---|
| 2370 | 1/1985 | Japan . |
| 39261 | 2/1987 | Japan . |
| 77946 | 4/1987 | Japan . |

*Primary Examiner*—Joseph W. Hartary
*Attorney, Agent, or Firm*—Roland I. Griffin

[57] ABSTRACT

The temperature of the ejector (12) of a thermal ink jet print head (10) is maintained within acceptable operating limits by measuring the current temperature, predicting the heat loading on a subsequent pass over a printing medium (32), and adjusting the temperature of the ejector (12), as necessary, by heating the ejector (12) or modifying the operation of the printer (60) to permit cooling of the ejector (12). The temperature of the ejector (12) is preferably measured by a thin film temperature measurement resistor (94) codeposited onto a substrate (14) with the thin film ejection resistors (22) that generate the droplets ejected from the ejector (12). Heating of the ejector (12) is preferably accomplished by passing a low level current through the ejection resistors (22). Cooling is preferably accomplished without the use of a fan by delaying the printing pass, or reducing the heat load during the printing pass by slowing the printing rate during that pass only.

20 Claims, 4 Drawing Sheets

INK JET PRINTER THERMAL CONTROL SYSTEM

BACKGROUND OF THE INVENTION

This invention relates to thermal ink jet printers, and, more particularly, to control of the temperature of the print head ejectors of such printers during printing operations.

Printers are devices that print characters onto a printing medium such as a sheet of paper or a polyester film. Printers of many types are available, and are commonly controlled by a computer that supplies the images, in the form of text or figures, that are to be printed.

Some printers used a colored liquid, such as an ink or a dye, but generally termed herein a colorant, to form the images on the printing medium. (By contrast, other printers use a dry toner to form the image.) Such printers deliver the colorant to the medium using a print head that creates the proper patterning of colorant to record the image.

One important type of printer is the thermal ink jet printer, which forms small droplets of colorant that are ejected toward the printing medium in the pattern of dots. The droplets are formed when an electrical current is passed through an electrical resistor in the ejector, vaporizing a small volume of colorant. The vaporized colorant expands, driving a droplet of colorant out of a nozzle to deposit as a dot on the printing medium. When viewed at a distance, the collection of dots form the image, in much the same manner that images are formed in newspapers. Ink jet printers are fast, producing a high output of printed image, and quiet, because there is no mechanical impact during formation of the image except for the droplets of ink striking the printing medium.

Typically, a thermal ink jet printer has an ejector with a large number of individual colorant ejection nozzles in a print head, with one resistor for each nozzle, supported in a carriage and oriented in a facing, but spaced-apart, relationship to the printing medium. The carriage and supported print head traverse relative to locations on the surface of the medium, with the nozzles ejecting droplets of colorant, at appropriate times under command of the controller, to produce a swath of droplets. The droplets strike the medium and then dry to form "dots" of color that, when viewed together, form one swath of the permanently printed image. The carriage is then moved an increment in the direction normal to the traverse (or, alternatively, the printing medium is advanced), and the carriage again traverses the page with the print head droplet ejector operating to deposit another swath of dots. In this manner, the entire pattern of dots that form the image is progressively deposited by the print head during a number of traverses of the page. To achieve the maximum output rate, the printing is preferably bidirectional, with the print head ejecting colorant during traverses from left-to-right and right-to-left.

One of the key operating parameters of the print head and ejector is its temperature of operation. Thermal energy is generated with each operation of an ejection resistor. Some of the energy leaves the printer in the ejected droplet, but some remains in the print head to heat it. The print head is constantly cooled by conduction to the surrounding air. The actual temperature of the print head is the result of a balancing of heating and cooling of the print head.

A typical thermal ink jet printer has specified minimum and maximum operating temperatures of the ejector, that define its operating range. If the operating temperature is less than the minimum, the ejection resistors cannot impart enough energy to each droplet to achieve proper ejection. If the operating temperature is greater than the maximum, there may be spurious ejection, irregularities in the ejected droplets, and choking of the nozzles as gas dissolved in the ink leaves solution to form bubbles in the ink flow channels.

These minimum and maximum values are temperatures measured at the ejector of the print head, and do not correspond directly to the air temperature where the printer is operated. However, the air temperature plays a part in determining whether the printer can stay within the specified temperature range. That is, a cold air temperature tends to cause the ejector to be nearer the low end of its range, and a warm air temperature tends to cause the ejector to be nearer the high end of its range. To be a viable commercial product, the thermal ink jet printer must be able to operate over a range of air temperatures, and still maintain the ejector temperature within the acceptable range.

It is known to use heaters and fan coolers within the printer, operating under control of a temperature sensor, to assist in maintaining the temperature of the ejector within the proper operating range. See, for example, U.S. Pat. No. 4,704,620, which emphasizes that the temperature control of the print heads must be carefully controlled, and provides a method for ensuring that the heaters will not overheat the print head and that the fans will not overcool the print head. The approach described therein utilizes a calculation of the heat transfer coefficients of the heaters and the fan in an attempt to keep the heat flowing into or out of the ejector within preconceived limits that will result in maintenance of the temperature range. The ejector itself is small and has very low thermal mass, and therefore careful attention is required to avoid overheating or overcooling. The use of heaters and a fan encourages increasing the thermal mass to avoid temperature swings through and out of the acceptable operating range, but the general principles of print head design call for reduced mass that must be supported on and moved by the carriage.

Although the system described in the '620 patent and available in the art is presumably operable, there is a need for an improved thermal control system for a thermal ink jet printer. Such a control system would preferably not use a fan to cool the ejector, since this component adds cost and weight to the printer, and increases the chances of a breakdown. The control system would also preferably achieve more precise temperature control than possible using heaters and a fan, without increasing the thermal mass of the ejector. The present invention fulfills this need, and further provides related advantages.

SUMMARY OF THE INVENTION

The present invention provides a thermal ink jet printer, print head, and thermal control methodology that achieve excellent control of the temperature of the ejector without the need for a fan. Thermal control is responsive to the actual printing demands of the printer and heat loading imposed thereby, and to temperature measurements at the ejectors, and not just to a preconceived heat loading pattern. The thermal control system of the invention does not add significantly to the cost or weight of a printer having no thermal control system, and is less costly than prior thermal control systems requiring separate heaters and fans.

In accordance with the invention, a thermal ink jet printer comprises print head means for ejecting droplets of colorant, the print head means including an ejection heater that heats the colorant; means for supporting the print head means; means for sensing the temperature of the print head means; means for predicting the extent of future operation required of the ejection heater; and means for establishing the temperature of the print head responsive to the means for predicting.

More specifically, a thermal ink jet printer comprises a print head having a plurality of ejection nozzles from which droplets of colorant may be ejected, and a thin film electrical resistance heater associated with each nozzle, the resistance heaters being deposited upon a substrate; a carriage that supports the print head and traverses it across a printing medium in a series of passes; a thin film temperature sensor deposited upon the same substrate as the thin film resistance heaters of the print head; means for predicting the heat loading of the ejector during a pass, prior to the initiation of the pass; and means for controlling the temperature of the print head responsive to the means for predicting.

The invention also extends to a process for maintaining the ejector temperature within an acceptable range. In accordance with this aspect of the invention, a process for controlling the temperature of the ejector portion of the print head of a thermal ink jet printer comprises the steps of sensing the temperature of the ejector; predicting the future temperature of the ejector from the amount of printing to be accomplished by the ejector during a future period; and controlling the temperature of the ejector responsive to the prediction of future temperature so that the actual temperature of the ejector is maintained within an acceptable operating range.

An important feature of the present invention is the thin film temperature measurement resistor that is deposited upon the ejector substrate, and provides an accurate, current measurement of the temperature at the substrate and the ejector. In accordance with this aspect of the invention, a thermal ink jet printer comprises a print head having a plurality of ejection nozzles from which droplets of colorant may be ejected, and a thin film electrical resistance heater associated with each nozzle, the resistance heaters being deposited upon a substrate; a carriage that supports the print head and traverses it across a printing medium in a series of passes; and a thin film temperature sensor deposited upon the same substrate as the thin film resistance heaters of the print head. Since the print head is often provided as a separable unit that is replaced as necessary, the print head itself utilizing the thin film temperature sensor is novel. In accordance with this aspect of the invention, a thermal ink jet print head comprises colorant ejector means including a plurality of thin film resistors deposited upon a substrate; and thin film sensing means for sensing the temperature of the colorant ejector means, the thin film sensing means being deposited upon the same substrate as the thin film resistors.

The temperature of the ejector of a thermal ink jet printer print head is determined by a balancing of heat flows in and out of the ejector. Heat flows into the ejector when the ejection resistors are operated during the printing operation to eject droplets of colorant that are then ejected toward the printing medium, and from the general thermal transfer from the environment if it is warmer than the ejector. Heat flows out of the print head with the droplets of ejected colorant, and by radiation and conduction if the ejector is warmer than its environment. Intentional heating and cooling, if any, also influence the temperature of the ejector.

Accurate temperature control is not readily achieved unless these various components of heat transfer are considered. However, the various heat flows are not easily modeled by any preestablished set of criteria, because a major influencing factor is the rate of production of heat and loss of heat by the ejector itself, which is in turn determined by the amount of printing that is performed. Where there is much printing (that is, many droplets ejected over a short period of time), for example, the heat loading into the ejector is high, and the rate of heat transfer out of the ejector through the droplets is also high.

The present invention therefore incorporates a temperature control system that utilizes the current temperature of the ejector, measured very accurately at a location on the ejector substrate, together with predictions of heat flow during the immediate future period of time. Such prediction is possible because of the mode of operation of ink jet printers, wherein the print to be deposited subsequently is decomposed into a droplet pattern that may be analyzed to determine the future droplet demand and thence heat loading.

The thermal control of the print head ejector involves several considerations. The temperature of the print head may be measured at different locations, and in different manners. Prior approaches measure the print head temperature at locations remote from the ejector, an approach that is unacceptable where precise information and control are required. The temperature at the ejector may differ from that in other portions of the print head, because the temperature of the ejector can vary over a range in a short time due to printing demands and because of the relatively low thermal conductivity of the remainder of the print head. The present approach preferably utilizes the thin film temperature measurement resistor deposited directly upon the same substrate upon which the ejection resistors are deposited. The substrate, which is normally silicon, has a high thermal diffusivity, so that the temperature measured by the thin film resistor is very nearly that at the ejector nozzles. Moreover, the thin film resistor and its associated circuitry can be deposited upon the substrate at the same time that the ejector resistors and related circuitry are deposited, so that there is virtually no additional cost in providing the temperature measurement resistor.

Another key consideration in controlling the temperature of the ejector is the future demand for ejection of droplets. In the normal mode of operation of a thermal ink jet printer, the print head is moved back-and-forth across the face of a printing medium in a series of passes by the carriage, while the printing medium is moved in a perpendicular direction relative to the print head between passes. On each pass, the print head ejector prints a pattern of dots, termed a swath. In this manner, the entire image is built up as a series of swaths deposited side-by-side on the printing medium.

The pattern of dots to be printed during any swath is determined by the driving computer or by a microcomputer built into the printer itself. That is, prior to the commencement of a swath, the pattern of dots, and thence the number of droplets required to form the swath, is calculated and known. The number of droplets to be deposited during the swath is the printing demand for the ejector during that swath. If the number of droplets or demand is high, then there will be a predictably large amount of heating of the ejector by ejection pulses to the ejection resistors during the swath. Conversely, if the number of droplets or demand is low, then there will be a predictably small amount of heating during the swath.

From this information, and an accurate measurement of the temperature of the ejector at the commencement of the swath, the final temperature of the ejector under various printing patterns can be predicted. If a normal printing mode causes the predicted temperature at the end of the swath to exceed an acceptable maximum limit, then the start of the printing of that swath can be delayed or the printing mode can be modified. If the temperature at the start of the swath is below the minimum permissible temperature, then the ejector can be heated before commencement of the swath by passing a small current through the ejection resistors. This heating current is calculated to be too small to cause ejection of colorant, but large enough to heat the ejector to at least the minimum acceptable operating temperature. Alternatively, a small current can be passed through the sensing resistor itself to heat the ejectors, between temperature measurements.

The precise method of predicting the temperature during any swath depends upon the specific printer, and a preferred approach is presented subsequently. However, in each case the future printing demand is utilized to predict the temperature at the end of the swath and possibly at intermediate points along the swath, to be certain that the temperature does not stray from the permitted range. By utilizing a swath by swath approach, the heating or cooling demand for a reasonable period of time into the future is predicted, obviating the need for highly precise thermal models. That is, on a swath by swath basis, relatively simple linear thermal models may be used and are normally acceptable. However, more complex models reflecting an advanced understanding of the effects of thermal inputs and losses may also be utilized.

The present invention provides an important advance in the thermal control of ink jet printers, that improves the performance of the printers. A predictive process provides the predicted heat loading for a future period of time, which is used in conjunction with the current temperature, measured very accurately at the ejector, to determine the temperature of the ejector in the future. The printing behavior can then be modified, if necessary, to ensure that the temperature limits of operation are not exceeded. Other features and advantages of the present invention will be apparent from the following more detailed description of the preferred embodiment, taken in conjunction with the accompanying drawings, which illustrate, by way of example, the principles of the invention.

DETAILED DESCRIPTION OF THE PREFERRED EMBODIMENT

Figure 1:
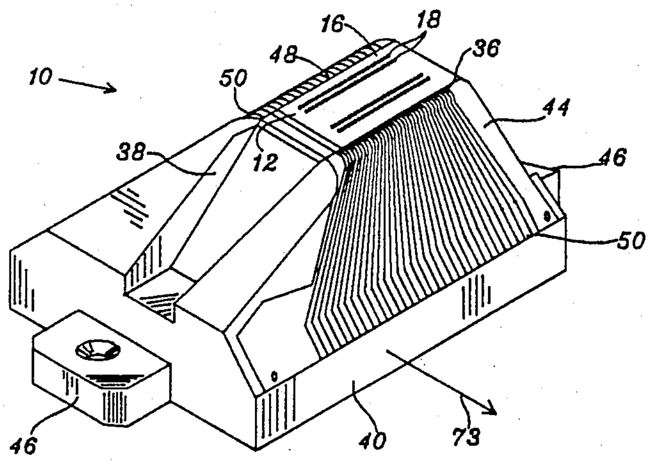
FIG. 1 is a perspective view of a thermal ink jet print head assembly.

The approach of the present invention is used in conjunction with a thermal ink jet printer. A thermal ink jet printer utilizes as the basic print head an assembly that creates and ejects microdroplets of ink by vaporization of a small bubble of colorant. A thermal ink jet print head assembly 10, used to eject droplets of colorant toward a print medium in a precisely controlled manner, is illustrated in FIG. 1. Such a print head assembly is discussed in more detail in U.S. Pat. No. 4,635,073, whose disclosure is incorporated by reference.

Figure 2:
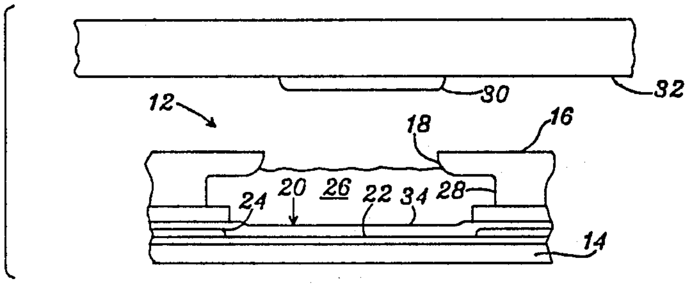
FIG. 2 is a schematic side view of an ejector.

The print head assembly 10 includes an ejector 12 having a silicon substrate 14 and a nozzle plate 16, depicted in FIG. 2. The nozzle plate 16 has a plurality of nozzles 18 therein. Droplets of colorant are ejected from the individual nozzles 18. (As used herein, the term "colorant" means generally a fluid that is deposited upon a printing medium to produce images, including but not limited to inks and dyes, and is not restricted to any narrow sense of that term as may be found in other arts.)

Droplets of colorant are ejected through the nozzles 18 by localized heating of the silicon substrate 14 with a heater 20. To effect such heating, the silicon substrate 14 has deposited thereon a plurality of tantalum-aluminum alloy planar resistors 22 with gold leads 24, one of the resistors being located adjacent each nozzle 18. An electrical current is passed through the portion of the resistor 22 between the ends of the leads 24 rapidly heating the resistor. A small volume of colorant adjacent the resistor 22 is thereby rapidly heated and vaporized, causing some of the colorant 26 in a reservoir 28 to be ejected through the nozzle 18 and thereafter to be deposited as a dot 30 on a printing medium 32 (such as paper or polyester). An optional passivation layer 34 overlies the resistor 22, to p protect it from corrosion and cavitation damage by the colorant.

Returning to FIG. 1, the ejector 12 is mounted in a recess 36 in the top of a central raised portion 38 of a plastic or metal manifold 40. The raised portion has slanted side walls 44, and end tabs 46 which facilitate its handling and attachment to a carriage mechanism in the printer, to be described subsequently.

External electrical connection to the leads 24 and thence to the resistors 22 is supplied through a set of traces 48 on the silicon substrate 14, connected to a flexible interconnect circuit 50, which may be of the type sometimes known as a TAB circuit. The circuit 50 fits against the side walls 44, with one end extending to the traces 48 and the other end to external connections to the controllable current source that supplies current to the resistors 22. The general features, structure, and use of such flexible interconnect circuits 50, and their fabrication, are described in U.S. Pat. No. 3,689,991, whose disclosure is incorporated by reference.

Figure 3:
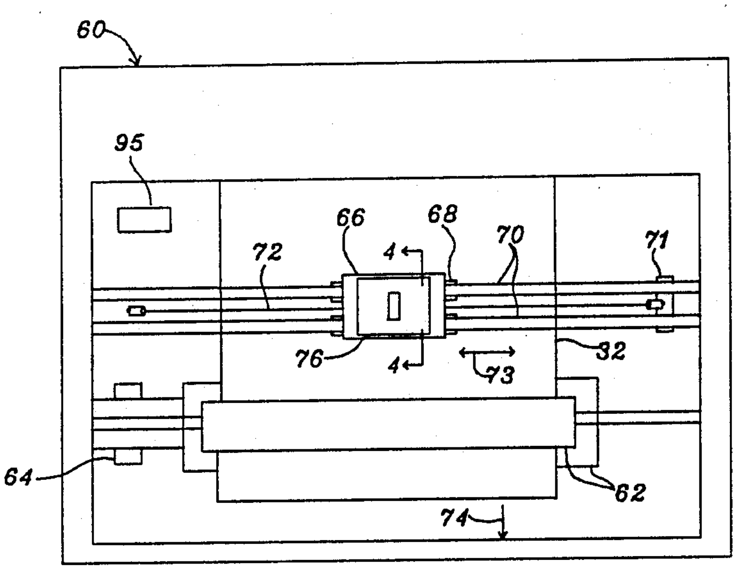
FIG. 3 is a plan view of a portion of an ink jet printer.
Figure 4:
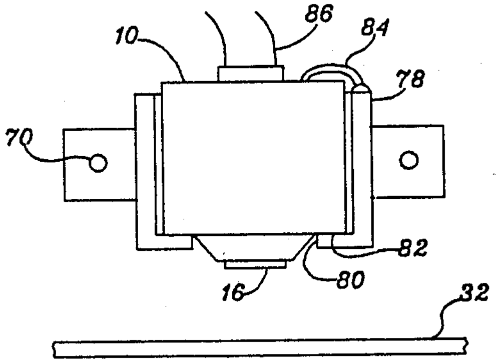
FIG. 4 is a side sectional view of the printer of FIG. 3, taken along lines 4—4.

FIGS. 3 and 4 illustrate a portion of one type of ink jet printer 60, which can utilize print heads of the type just discussed. The printer 60 includes platens 62 between which a sheet of the printing medium 32 is captured. One or both of the platens 62 are rotatably driven by a stepping motor 64 that causes them to controllably rotate in either direction. Rotation of the platens 62 advances the printing medium in the selected direction.

A carriage 66 is supported above the printing medium 32 on bearings 68 from rails 70. The carriage 66 slides along the rails 70 under the control of a traversing motor 71 acting through a wire or belt 72 that extends from the motor 71 to the carriage 66. The direction of movement of the carriage 66 along the rails 70 is termed the "traversing direction", indicated by numeral 73. The traversing direction 73 is perpendicular to the direction of the advance of the printing medium through rotation of the platens 62, termed the "paper advance direction" and indicated by numeral 74.

One or more of the print heads 10 is supported in the carriage 66, in a generally facing but spaced apart relationship to the printing medium 32, in the manner illustrated in FIGS. 2 and 4, so that ink droplets ejected from the ejector 12 strike the printing medium. If the printer is only for printing of single colors, then only one print head is required. Multiple print heads are needed where a variety of colors are to be printed. The present invention is applicable whether one or multiple print heads are used, but is discussed herein in relation to a single print head for simplicity. Where multiple print heads are used, then the most limiting conditions must be considered in determining a printing strategy.

The print head 10 is mounted in a support 76 on the carriage 66. The support 76 preferably includes a body 78 and an aperture 80 therethrough. The print head 10 slides into the aperture 80 to rest against a shoulder 82. A retainer clip 84 holds the print head 10 in position within the aperture 80 and against the shoulder 82. Plug-in electrical connectors 86 extend to the print head 10 from the control circuitry of the printer.

Figure 5:
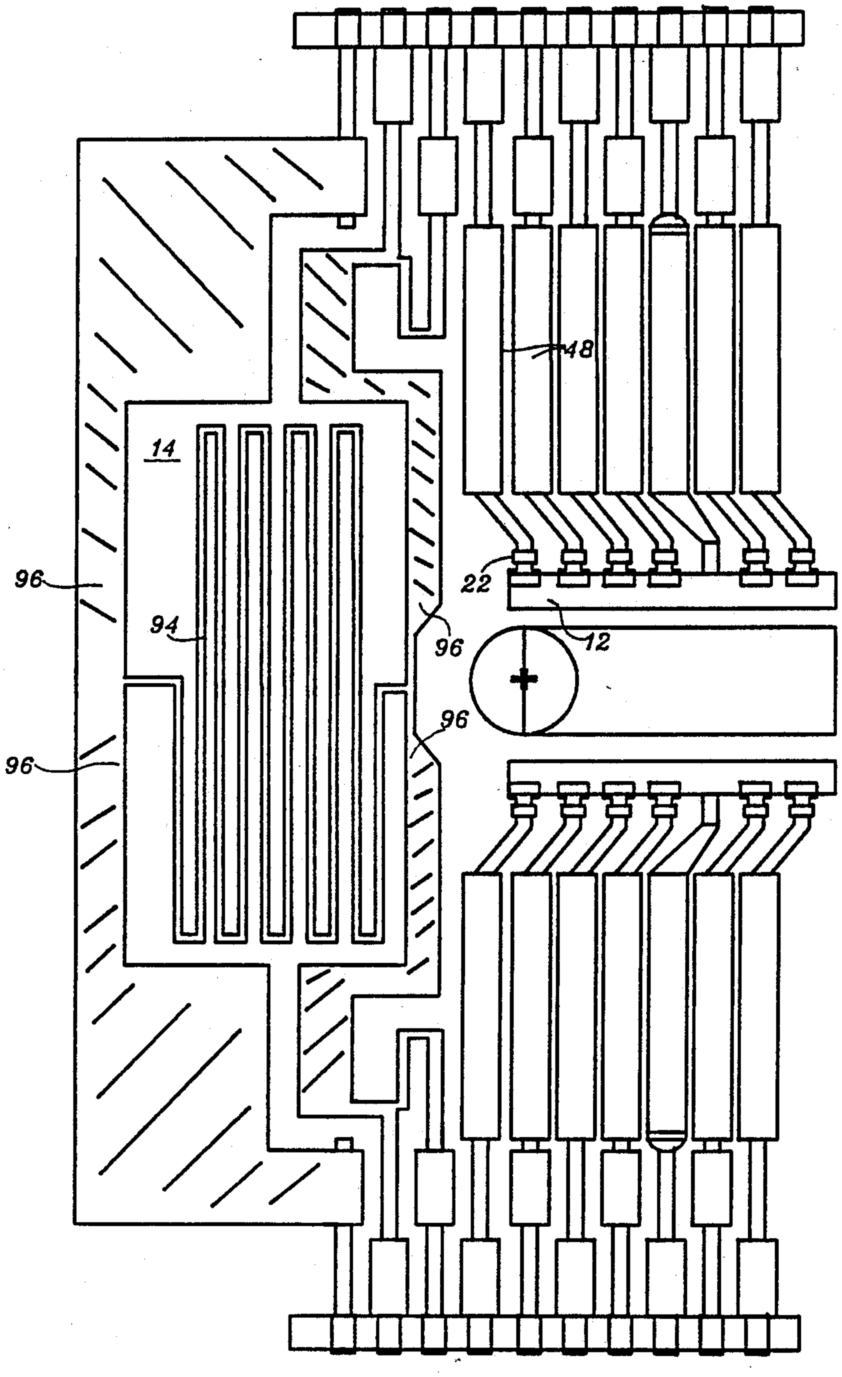
FIG. 5 is a plan view of the electrical leads for the ejector resistors and the thermal measurement resistor deposited upon the substrate.

FIG. 5 presents an enlarged plan view of a detail of the substrate 14 with traces 48 to the ink ejection resistors 22 shown thereon (and the nozzle plate 16 removed). A thermal sensing resistor 94 is deposited upon the same substrate 14, with measurement leads 96 extending thereto. The resistor 94 is made of a material whose temperature coefficient of resistance is sufficiently high that measurements of resistance can be converted directly to a temperature value for the resistor 94. An acceptable resistor material is aluminum or an aluminum-copper alloy with less than about 5 percent by weight copper. Because the resistor 94 is positioned directly adjacent the ejector 12 on a substrate of relatively high thermal conductivity, its temperature provides a close approximation to that of the ejector 12. For the same reason, the temperature of the resistor 94 follows changes in the temperature of the ejector 12 quite closely. The illustration of FIG. 5 depicts the presently preferred approach wherein the resistor 94 is deposited as a single length or resistance material at one end of the ejector. Alternatively, the resistor 94 may be deposited with portions in different locations around the ejector, as on the sides and at both ends, to provide an even more accurate measurement of the actual temperature in the neighborhood of the nozzles 18. At the present time, the configuration of FIG. 5 has been found satisfactory for temperature measurement and control. In any event, the leads 96 to the resistor 94 are attached to the flexible interconnect circuit 50 in the same manner as the traces 48, so that the temperature can be measured externally.

To accomplish the measurement of temperature externally to the print head, the four-wire measurement technique is preferably used, requiring that there be four leads 96, two to each end of the resistor 94. A current is passed through the resistor 94 using one pair of the leads 96, and the voltage drop across the resistor 94 is measured with the second pair of leads at the opposite ends of the resistor 94. The voltage drop and current are converted to electrical resistance, which is a known function of temperature and is stored in the computer as a formula or table.

Figure 6:
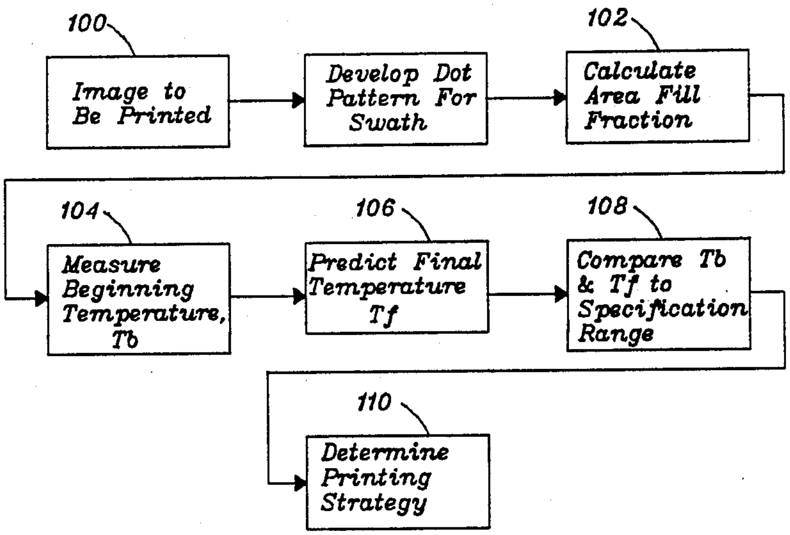
FIG. 6 is a flow chart illustrating the process for thermal control of the ejector.

FIG. 6 illustrates the presently preferred process for determining the printing strategy that permits printing without exceeding the allowed temperature range, on either the high end or the low end. From the image to be printed 100, which is supplied by the computer, the dot pattern to be deposited is calculated from well known algorithms. See, for example, "Principles of Interactive Computer Graphics", by William M. Newman and Robert F. Sproull, McGraw Hill, 1979, pages 213–243 and the "Hardware Support Manual for Hewlett Packard 7600 Series Printers, For Models 240D and 240E Electrostatic Plotters", Hewlett Packard Corp., 1988, at pages 5-1 to 5-4, both of which publications are incorporated by reference. Those procedures are well known, and performed by existing ink jet printers as a matter of course.

The printing demand is calculated, numeral 102, from the number of dots required for the swath. It has been found convenient to define an area fill fraction as the number of dots printed during a swath divided by the total number of possible dots in a swath. The area full fraction provides a direct indicator of the printing demand during the swath, which in turn is used to predict heat loadings. The area fill fraction can be determined as a function of position in a similar manner, so that the printing demand as a function of position is known. This information would be particularly useful where images appear on one side of the page, and large portions of the other side of the page are blank, for example. However, at the present time it has been found sufficient to determine the overall area fill fraction during a pass, and work with only the beginning and ending temperatures.

The current or beginning value of temperature $T_b$ is measured, numeral 104, prior to the initiation of the printing of the swath using the thermal sensing resistor 94 and the measurement procedure previously described.

The predicted temperature $T_f$ at the end of the swath is then calculated, numeral 106, using the following formulation:

$$T_f = T_b + dT_{print} + dT_{environment},$$

where $dT_{print}$ is the change in temperature due to the printing demands, and $dT_{environment}$ is the change in temperature that would normally occur due to heating or cooling of the print head as it is moved through the ambient air.

$dT^{print}$ is determined from a table lookup or corresponding formula expressing the relationship between printing demand and the heat flow during printing. The ejector normally heats during printing. Heat flows into the ejector in the form of electrical energy that is converted to heat by the resistors 22. Some of that heat flows out of the ejector as heated colorant and heated gas, during ejection of each droplet. The net heat flow per droplet (the heat input less the heat lost per droplet) and the increase in temperature of the ejector are calculated or measured, and expressed as a function of the area fill fraction. For example, an increase in the area fill fraction means that the total net heat retained in the ejector will increase, and that the temperature of the ejector will increase. The preferred approach is to establish a calibration table or curve of $dt_{print}$ by direct measurement of print head operation as a function of area fill fraction for the print head, and store that calibration in the computer for use in finding $dt_{print}$. Such measurements are performed by the manufacturer prior to sale to the user, so that the thermal control is not apparent to the user.

$dT_{environment}$ is similarly determined from a table lookup or corresponding formula expressing the heat flow into or out of the ejector as it moves through the ambient air. The temperature of the ambient air is measured by a temperature resistor positioned well away from the ejector, preferably on the frame of the printer, such as the resistor 95 illustrated in FIG. 3. The resistor 95 is used to sense ambient air temperature using the same four-point measurement technique previously described in relation to the resistor 94. For example, if the air temperature is cool and the print head moves through it without any ink ejection, the print head and ejector are expected to cool down. The value of $dT_{environment}$ is ascertained from the table of calibration measurements or a formula wherein the average coefficient of thermal transfer is multiplied by the difference in temperature of the ejector and the environment. Again, the preferred method for establishing this relationship is measurements conducted by the printer manufacturer prior to sale of the product to the user, so that the calibration procedures need not be of concern to the user.

The three components of temperature are added according to the above formula to predict the final temperature $T_f$, numeral 106. The beginning temperature $T_b$ and final temperature $T_f$ are then compared to the permissible temperature range of operation, numeral 108, and a printing strategy is determined, numeral 110. Normally, $dt_{print}$ is positive and causes a temperature increase, and $dT_{environment}$ is negative and causes a temperature decrease. Thus, a balancing of temperature to within the acceptable range is achieved by an appropriate strategy involving the printing rate, the time permitted for cooling without printing, and heating pulses introduced, as required.

In the preferred approach wherein only the beginning and ending temperatures are considered, there are five possible conditions of operation, which are not mutually exclusive. In the first, both the beginning and predicted final temperatures are within limits, and the printing proceeds with no modifications to the printing cycle.

In the second, the beginning temperature is below the acceptable minimum temperature. In that event, the computer commands the printer to send low level electrical warming currents through the resistors 22 or 94 to warm the ejector. The currents are too small to cause ejection of colorant, but cumulatively warm the ejector to a temperature greater than the minimum acceptable operating temperature.

In the third, the temperature of the ejector is initially too high. In that event, the starting of the printing swath is delayed until natural cooling of the ejector reduces its temperature to below the maximum permitted temperature.

In the fourth, the predicted temperature of the ejector at the end of the swath is too low. In that event, small electrical warming currents may be passed through the resistors 22 during the pass and printing of the swath at intermediate times when particular resistors 22 are not operating, or through the resistor 94 when temperature measurements are not taken. As described previously, the warming currents are too small to cause colorant ejection, but are sufficient to warm the ejector so that it does not fall below the minimum acceptable temperature.

In the fifth, the predicted temperature of the ejector at the end of the swath is too high. In that event, printing of the swath is commenced but an alternative printing strategy is used. Many different approaches are possible to reduce the temperature rise during the swath resulting from printing, and three exemplary strategies are listed. In one, where the beginning temperature is near the high end of the range or perhaps exceeding the maximum temperature, the initiation of printing is delayed to permit cooling, so that both the beginning and final temperatures are within the acceptable temperature range. In a second, printing of the swath is initiated immediately but at a reduced rate of carriage movement and droplet output, permitting environmental cooling to balance the heat input from the printing demand. In a third, printing of the swath is initiated immediately at the normal rate of carriage movement, but only a fraction, typically half, of the dots are printed on the pass, and the remaining dots are printed on the next pass without advancing the printing medium. Of course, other and more complex printing strategies can be envisioned.

As noted previously, more complex strategies regarding the temperature distribution of the ejector at points along the swath can also be adopted, but these consume processing and memory of the computer. At the present time, the outlined approach of beginning and ending temperature determinations has been found sufficient and is preferred.

As a further diagnostic aid in assessing the operation of the printer, the predicted temperature at the end of the swath $T_f$ is compared with the measured temperature at the beginning of the next swath. Or alternatively, the ending temperature at the end of the swath is measured using the resistor 94, and compared with the predicted ending temperature $T_f$. If the actual measured temperature is significantly greater than the predicted temperature, a plugged nozzle or deprimed nozzle is indicated. Such a problem causes a degraded printed image. That is, where no colorant is ejected from a particular nozzle even though heating pulses are sent to its ejection resistor 22, the temperature of the ejector rises much faster than predicted by the model, because some of the heat produced by the ejection resistors 22 is not being carried away from the ejector as in normal operation. This information of an unexpectedly large temperature rise can be used to indicate to other automated systems in the printer the need to correct the problem, or to signal the user if the problem cannot be corrected automatically by the printer.

The present invention provides a thermal control system and strategy that permits the ejector of a thermal ink jet printer to be maintained within acceptable operating limits without the need for a fan or other expensive cooling device. Although a particular embodiment of the invention has been described in detail for purposes of illustration, various modifications may be made without departing from the spirit and scope of the invention. Accordingly, the invention is not to be limited except as by the appended claims.

What is claimed is:

1. A thermal ink jet printer, comprising:

print head means for ejecting droplets of ink during operation, the print head means including an ejection heater that heats the ink;

means for supporting the print head means;

means for sensing the temperature of the print head means;

means for predicting the future extent of operation required of the ejection heater during a period of time; and means for establishing the temperature of the print head during the period of time responsive to the means for predicting.

2. The printer of claim 1, wherein the means for supporting includes a carriage that moves the print head across a printing medium in a succession of passes.

3. The printer of claim 1, wherein the means for sensing is a temperature-sensitive thin film resistor deposited upon the print head.

4. The printer of claim 1, wherein the means for predicting includes means for counting the number of droplets of ink to be ejected from the print head means during a period of time.

5. The printer of claim 1, wherein the means for establishing includes means for heating the print head.

6. The printer of claim 1, wherein the means for establishing includes means for passing an electrical current through at least one of the ejection heaters.

7. The printer of claim 1, wherein the means for establishing includes means for modifying the operation of the means for supporting to permit the print head to be maintained below a selected maximum temperature.

8. The printer of claim 1, wherein the means for establishing includes means for delaying a pass of the means of supporting.

9. The printer of claim 1, wherein the means for establishing includes means for slowing the rate of movement of the means for supporting.

10. The printer of claim 1, wherein the means for establishing includes means for altering the printing sequence of ejecting droplets by the print head.

11. The printer of claim 1, wherein the means for predicting includes means for estimating the printing demand during a swath of printing.

12. A thermal ink jet printer, comprising:

a print head having a plurality of ejection nozzles from which droplets of ink may be ejected, and a thin film electrical resistance heater associated with each nozzle, the resistance heaters being deposited upon a substrate;

a carriage that supports the print head and traverses it across a printing medium in a series of passes;

a thin film temperature sensor deposited upon the same substrate as the thin film resistance heaters of the print head; and means for predicting the heat loading of the print head during a period of operation, prior to the commencement of the period of operation.

13. The thermal ink jet printer of claim 12, wherein the means for predicting includes:

a counter that counts the number of droplets that are to be ejected during a pass, prior to the pass.

14. The thermal ink jet printer of claim 12, further including:

means for controlling the temperature of the print head responsive to the means for predicting.

15. A thermal ink jet printer, comprising:

a print head having a plurality of ejection nozzles from which droplets of ink may be ejected, and a thin film electrical resistance heater associated with each nozzle, the resistance heaters being deposited upon a substrate;

a carriage that supports the print head and traverses it across a printing medium in a series of passes;

a thin film temperature sensor deposited upon the same substrate as the thin film resistance heaters of the print head;

means for predicting the heat loading of the ejector during a pass, prior to the initiation of the pass; and means for controlling the temperature of the print head responsive to the means for predicting.

16. A process for controlling the temperature of the ejector portion of the print head of a thermal ink jet printer, comprising the steps of:

sensing the temperature of the ejector;

predicting the future temperature of the ejector from the amount of printing to be accomplished by the ejector during a future period; and controlling the temperature of the ejector responsive to the prediction of future temperature so that the actual temperature of the ejector is maintained within an acceptable operating range.

17. The process of claim 16, wherein the step of predicting the future temperature is accomplished according to a relationship $$T_f = T_b + dt_{print} + dT_{environment}$$

where $T_f$ is the final temperature at the end of a period of printing, $T_b$ is the temperature of the ejector measured in the step of sensing, $^{T}$print is the predicted temperature change due to printing demand, and $dT_{environment}$ is the predicted temperature change due to the environment in which the ejector operates.

18. The process of claim 17, wherein $dt_{print}$ is determined from a calibrated relationship between temperature change and amount of printing required during the future period.

19. The process of claim 17, wherein $dT_{environment}$ is determined from a calibrated relationship between temperature change and ambient temperature.

20. The process of claim 16, including the additional steps, after the step of controlling, of measuring the actual temperature at the end of the future period, and comparing the predicted and actual temperatures at the end of the future period.

* * * * *